United States Patent
Kröll (10) Patent No.: US 12,209,681 B1
(45) Date of Patent: Jan. 28, 2025

(54) TORQUE LIMITER FOR VALVE ACTUATORS

(71) Applicant: Watts Regulator Co., North Andover, MA (US)

(72) Inventor: Markus Kröll, Dattenberg (DE)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 18/347,800

(22) Filed: Jul. 6, 2023

(51) Int. Cl.
*F16K 31/04* (2006.01)
*F16D 7/02* (2006.01)
*F16K 31/44* (2006.01)

(52) U.S. Cl.
CPC ............ *F16K 31/045* (2013.01); *F16D 7/022* (2013.01); *F16K 31/44* (2013.01)

(58) Field of Classification Search
CPC ....................................................... F16D 7/022
See application file for complete search history.

(56) References Cited

U.S. PATENT DOCUMENTS

| | | | | |
|---|---|---|---|---|
| 2,371,855 A | * | 3/1945 | Sunderland | F16D 7/022 464/44 |
| 2,459,972 A | * | 1/1949 | William | F16D 7/022 192/81 C |
| 2,883,144 A | * | 4/1959 | Kendig | F16K 31/1655 92/33 |
| 2,966,973 A | * | 1/1961 | Hayes | F16D 43/206 192/56.54 |
| 3,258,985 A | * | 7/1966 | Jordan | F16K 31/047 74/388 R |
| 3,335,835 A | * | 8/1967 | Conlon | F16D 7/022 192/81 C |
| 3,441,115 A | | 4/1969 | Gunther | |
| 4,114,078 A | | 9/1978 | Malinski et al. | |
| H636 H | * | 6/1989 | Elliott | F16K 31/60 464/38 |

(Continued)

FOREIGN PATENT DOCUMENTS

| | | |
|---|---|---|
| CN | 209725381 U | 12/2019 |
| DE | 3139140 A1 | 8/1982 |

(Continued)

OTHER PUBLICATIONS

Technical Manual Model D86 Overtorque Protector, Jun. 2016, 2 pages.

(Continued)

*Primary Examiner* — Umashankar Venkatesan
(74) *Attorney, Agent, or Firm* — Day Pitney LLP; George Chaclas (57) ABSTRACT

A torque limiting coupling assembly shields a valve actuator from abnormally high levels of torque. In normal operation, an actuator coupling transfers a driving torque from an actuator coupling to a valve shaft coupling and the valve shaft coupling engenders a shaft torque on a shaft of a valve. In torque actuated operation, when a counter torque applied to the shaft coupling exceeds a threshold value, the actuator coupling freely rotates relative to the valve shaft coupling and the driving torque is transferred to a biasing element of the torque limiting coupling assembly rather than to the valve shaft coupling, thereby shielding the valve or the actuator from high levels of torque.

15 Claims, 6 Drawing Sheets

(56) References Cited

U.S. PATENT DOCUMENTS

| | | | | |
|---|---|---|---|---|
| 4,860,992 | A * | 8/1989 | Aunspach | F16K 31/44 |
| | | | | 464/46 |
| 5,211,455 | A * | 5/1993 | Matouka | B60T 8/4266 |
| | | | | 303/115.2 |
| 5,564,461 | A | 10/1996 | Raymond, Jr. et al. | |
| 7,540,467 | B2 * | 6/2009 | Roundy | F16K 31/5282 |
| | | | | 251/305 |
| 10,605,375 | B2 * | 3/2020 | Ohashi | F16K 31/043 |
| 2021/0180713 | A1 * | 6/2021 | Mariano | F16K 31/042 |

FOREIGN PATENT DOCUMENTS

| | | |
|---|---|---|
| DE | 19845684 A1 | 4/2000 |
| DE | 102004056515 B4 | 6/2006 |
| DE | 1008043883 A1 | 5/2010 |
| DE | 102008043878 A1 | 5/2010 |
| JP | 200190859 A | 4/2001 |
| WO | 2022194527 A1 | 9/2022 |

OTHER PUBLICATIONS

Bar, a Watts brand Technical data sheet, Reductions type Red for pneumatic actuators Product description, 2020, 3 pages.
Valworx Square Adapters Stinless Steel Construction ISO5211/DIN3337 Namur Series 5800, 2 pages, 2019.

* cited by examiner

TORQUE LIMITER FOR VALVE ACTUATORS

BACKGROUND OF THE INVENTION

1. Field of the Invention

The subject disclosure relates to valve assemblies, and more particularly to actuated valve assemblies having features for limiting an amount of torque transferred to an actuator.

2. Background of the Related Art

A known valve assembly may include an actuator, for example an electro-mechanical actuator, that couples to a valve shaft of a valve. The actuator can apply a torque to the valve shaft to move a valve element of the valve between operating positions of the valve assembly. In the known valve assembly, the valve shaft is typically coupled directly to a valve shaft interface of the actuator or connected with a normal shaft adapter, for example with an adapter type WA provided by BAR GmbH, Dattenberg, Germany. A typical shaft adapter has no moving elements, connects the actuator to the shaft of the valve, and transmits the torque of the actuator to the valve. Torque generated by the actuator in a first direction, e.g., in a counter-clockwise direction, is transferred directly to the valve shaft, and therethrough to the valve element, causing rotation of the valve element within a valve housing.

In some use conditions, the valve element may become stuck, for example by debris lodged between the valve element and a portion of the valve housing. In other use conditions, the valve element may be subjected to an excessive amount of fluid pressure, for example when the known valve assembly is operated during a high pressure event of a fluid system that includes the valve assembly. In both of these use conditions, when the actuator attempts to cause rotation of a stuck or over-pressured valve element, the valve element may be subjected to a large amount of counter-torque. The counter-torque is capable of damaging one or more of the valve element, the valve shaft, and the actuator. For example, if the actuator operates to move the valve element between the open position and the closed position while the valve element is subjected to counter-torque, for example counter-torque generated by a blockage which prevents the valve element from moving, the valve shaft may be stressed beyond a failure point and break.

SUMMARY OF THE INVENTION

These and other problems are solved by the subject technology. The subject technology improves upon actuated valve assemblies by proving a torque limiting coupling assembly that shields a valve from excessive torque that would otherwise be transferred to the valve element from a valve shaft connected to an actuator and from an excessive amount of torque that would otherwise load the valve shaft. The torque limiting coupling assembly is disposed between a valve shaft and the actuator. The torque limiting coupling assembly decouples rotation of the valve shaft from rotation imparted by the actuator when the valve element encounters excessive resistance to movement. Torque applied to the torque limiting coupling assembly by the actuator is translated into a linear force which tends to compress a bias element of the torque limiting coupling assembly rather than force rotation of the valve shaft against the excessive resistance to movement.

In light of the needs describe above, in at least one aspect, the present disclosure is directed to a torque limiting coupling assembly for a valve assembly having a valve element and an actuator for moving the valve element. The torque limiting coupling assembly includes a valve shaft coupling for connecting to the valve element. The valve shaft coupling forms opposing helical grooves, each helical groove having a distal closed end. The torque limiting coupling assembly also includes an actuator coupling for connecting to the actuator and secured to the valve shaft coupling along an axis for free rotation about the axis. The actuator coupling has a collar and forms opposing linear axial grooves. The torque limiting coupling assembly further includes a sleeve slidably mounted on the valve shaft coupling and the actuator coupling. The sleeve forms two or more radially inward facing distal bosses captured to slide in the respective helical groove and two or more radially inward facing proximal bosses captured to slide in the respective linear axial groove. In addition, the torque limiting coupling assembly includes a bias element extending between the collar and sleeve to bias the sleeve distally so that the two radially inward facing distal bosses are normally in the distal closed end of the respective helical groove.

In normal operation, when the actuator rotates the actuator coupling in a first direction, the sleeve rotates with the actuator coupling by virtue of the radially inward facing proximal bosses in the vertical grooves and the valve shaft coupling rotates with the sleeve by virtue of the radially inward facing distal bosses pressed into the distal closed end of the vertical grooves by the bias element and, thereby, the valve element turns with the valve shaft coupling.

In torque actuated operation, during movement or attempted movement in the first direction when the valve element requires abnormal force to move, torque is limited by the actuator coupling turning freely with respect to the valve shaft coupling so that the radially inward facing distal bosses are driven proximally in the helical grooves by the valve shaft coupling to compress the bias element while the actuator coupling rotates with respect to the valve shaft coupling rather than forcing the valve shaft coupling to turn.

In some embodiments, the bias element is selected from the group consisting of: a helical spring; a flexure washer spring; and leaf springs. Upon return from torque actuated operation to normal operation, the valve shaft coupling rotates with respect to the actuator coupling so that the valve shaft coupling and the actuator coupling return to correct normal alignment. When the actuator moves the valve element in a second direction opposite the first direction, the radially inward facing distal bosses slide into the distal closed end of the respective helical groove. The linear axial grooves can have a closed proximal end that forms a travel stop of the sleeve. A bottom surface of the actuator coupling may enclose the helical grooves to form a travel stop of the sleeve.

In at least one aspect, the present disclosure is directed to a torque limiting coupling assembly for a valve assembly having an actuator coupling configured to be coupled to a rotational actuator and to receive a driving torque from the rotational actuator. A valve shaft coupling is configured to be coupled to a valve shaft and to apply a shaft torque to the valve shaft. A sleeve is configured to connect the actuator coupling and the value shaft coupling. The torque limiting coupling assembly is configured to, in a first operating configuration, transfer the driving torque received from the rotational actuator to the valve shaft coupling, thereby generating the shaft torque. The torque limiting coupling assembly is configured to, in a second operating configuration, transfer the driving torque received from the rotational actuator to the bias element. In a third operating configuration, the torque limiting coupling assembly is configured to translate a linear force applied to the sleeve by the bias element into a rotational torque and to transfer the rotational torque to the valve shaft coupling, thereby generating the shaft torque.

In some embodiments, the valve includes a valve element and the valve shaft is coupled to the valve element so that in the first operating configuration, the driving torque provided by the rotational actuator moves the valve element to a selected position. In the second operating configuration, the driving torque provided by the rotational actuator moves only the actuator coupling to a rotational orientation that corresponds to the selected position of the valve element. In the third operating configuration, the torque limiter coupling moves the valve element to the selected position.

Preferably, the torque limiting coupling assembly is configured to transition from the first operating configuration to the second operating configuration when resistance to motion of the valve coupling imparts a resistance torque on the valve shaft coupling having a magnitude that surpasses a torque trip value. The torque trip value can correspond to a magnitude of a resistance to compressive force provided by the bias element.

In some embodiments, the actuator coupling, the valve shaft coupling, and the sleeve are each disposed coaxially along a common central axis. The actuator coupling comprises a collar extending radially outward relative to the central axis, and the bias element is disposed between a bottom surface of the collar and a top surface of the sleeve and is configured to urge the sleeve away from the actuator coupling and toward the valve shaft coupling.

The sleeve and the valve shaft coupling may each be disposed along a common axis and comprise a mechanical interface therebetween. The mechanical interface includes one or more helical grooves disposed on an outer surface of the valve shaft coupling and extending longitudinally along the common axis and one or more radially inward facing distal bosses extending from an inner surface of the sleeve. Each of the one or more radially inward facing distal bosses is configured to interface with a one of the helical grooves and the mechanical interface is configured to urge linear motion of the sleeve relative to the actuator coupling along the common axis when resistance to motion of the valve shaft coupling imparts the resistance torque on the valve shaft coupling having a magnitude that surpasses the torque trip value.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed technology appertains will more readily understand how to make and use the same, reference may be had to the following drawings.

DETAILED DESCRIPTION OF PREFERRED EMBODIMENTS

The subject technology overcomes many of the prior art problems associated with actuated valve assemblies. The advantages, and other features of the technology disclosed herein, will become more readily apparent to those having ordinary skill in the art from the following detailed description of certain preferred embodiments taken in conjunction with the drawings which set forth representative embodiments of the present technology and wherein like reference numerals identify similar structural elements. Directional indications such as proximal, distal, upward, downward, right, left and the like are used with respect to the figures and not meant in a limiting manner.

Figure 1:
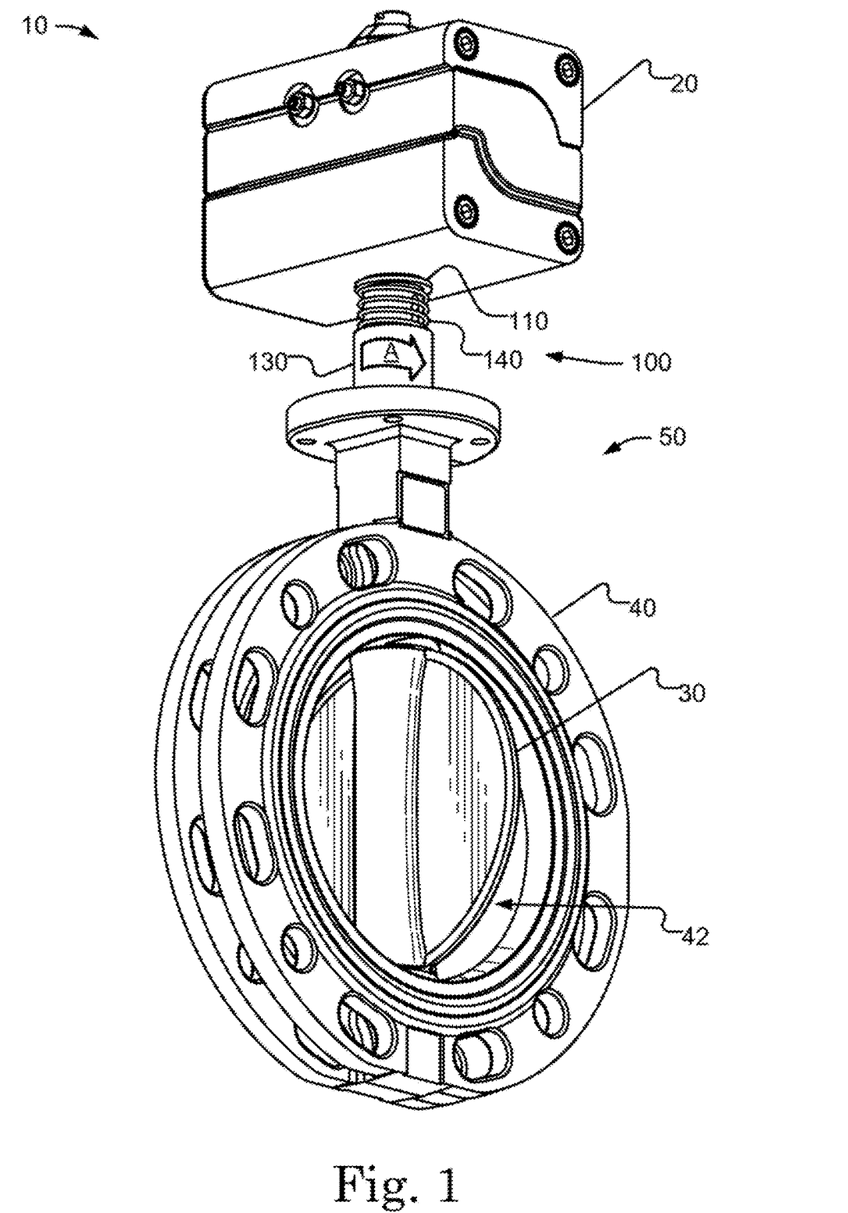
FIG. 1 is a perspective view of a valve assembly including a torque limiting coupling assembly in accordance with the subject disclosure.
Figure 2:
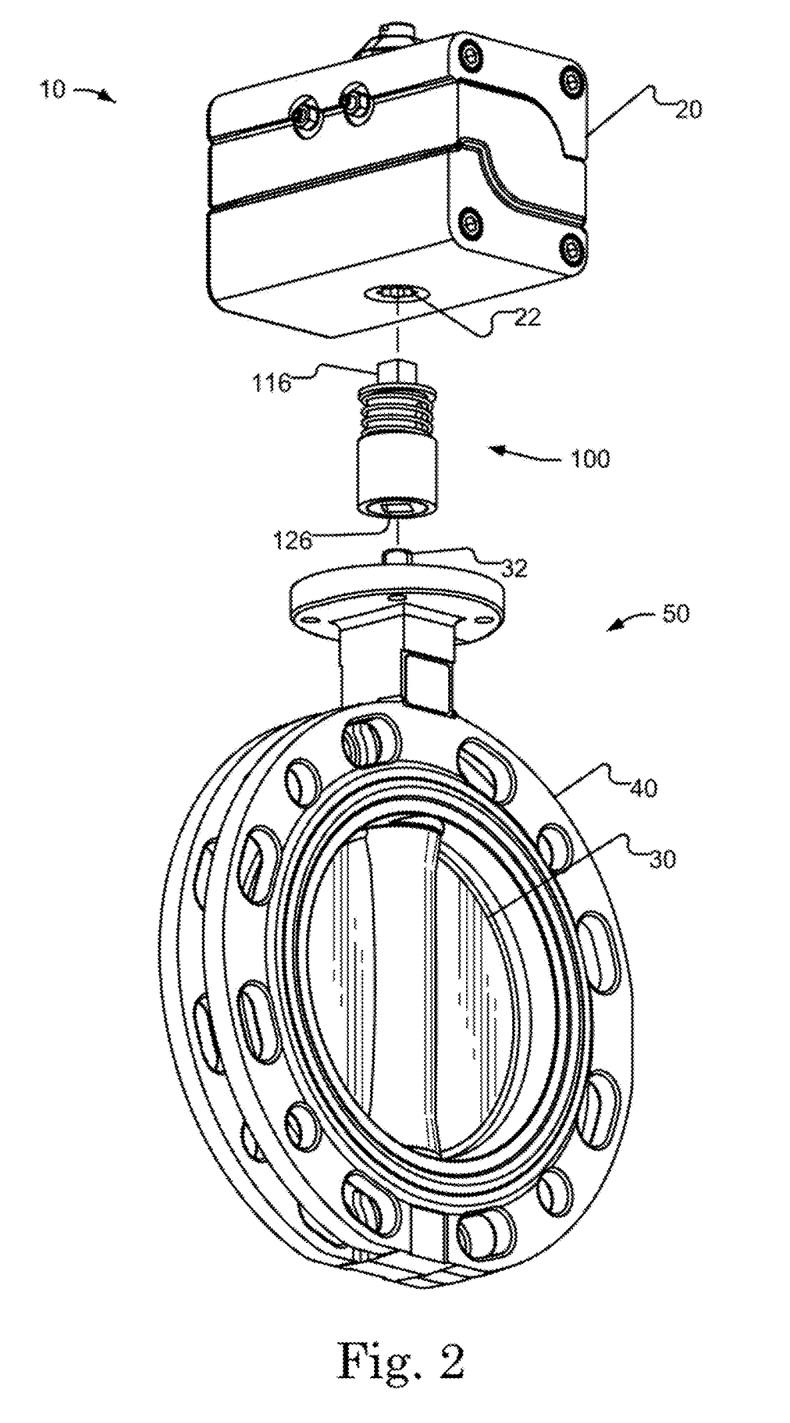
FIG. 2 is a partially exploded perspective view of the valve assembly of FIG. 1.

Referring to FIGS. 1 and 2, there are shown perspective views of an embodiment of a valve assembly 10 in accordance with the subject disclosure. The valve assembly 10 includes valve 50 having a valve housing 40, a valve element 30, and a valve shaft 32 that extends through the valve housing 40 to the valve element. The valve element 30 is rotatable within the valve housing 40 to block or partially block a flow of medium, for example a fluid, e.g., a liquid or gas, or slurry, through an opening 42 of the valve housing, thereby providing control over the flow of medium through the valve assembly 10.

The valve assembly 10 further includes an actuator 20 having a valve shaft interface 22, which is coupled directly to the valve shaft 32 for applying torque to the valve shaft 32 to move the valve element 30 between positions, such as between an open position, shown in FIG. 1, and a closed position, shown in FIG. 2. Typically, the actuator 20 is operated by a controller (not shown) to move the valve element to a desired position. A user can operate the actuator 20, or interact with a controller that operates the actuator 20, to adjust a position of the valve element 30 for providing a desired flow of the medium. Example selectable flows of medium include full flow when the valve element 30 is in a fully open position, as shown in FIG. 1, no flow when the valve element 30 is in a closed position, as shown in FIG. 2, and a selectable partial flow when the valve element 30 is in a partially open position (not shown) between the fully open and closed positions.

The actuator 20 is typically coupled directly to the valve shaft 32. In the valve assembly 10 according to the subject disclosure, the valve shaft interface 22 is indirectly connected to the valve shaft 32 by a torque limiting coupling assembly 100. Driving torque generated by the actuator 20 is applied to the valve shaft 32 through the torque limiting coupling assembly 10.

In an alternative embodiment, not shown, torque may be applied to a valve shaft 32 by a manually operated device such as a valve handle, as is known, and the torque limiting coupling assembly 100 may be disposed between the manually operated device and the valve shaft 32 to protect the valve 50 from excessive torque applied by the manually operated device.

The torque limiting coupling assembly 100 is disposed between the actuator 20 and the valve element 30. The torque limiting coupling assembly 100 includes an actuator interface 116 for coupling with valve shaft interface 22 of the actuator 20 and a valve stem interface 126 for coupling with the valve stem 32 of the valve element 30. Driving torque generated by the actuator 20 is transferred through the torque limiting coupling assembly 100 to the valve shaft 32 to generate a shaft torque and to move the valve element 30 between positions.

The torque limiting coupling assembly 100 operates to limit the amount of torque that is transferred to the valve shaft 32 and therethrough to the valve element 30, thereby protecting the valve 50 from damage.

As shown, the valve housing 40 and valve element 30 are components of a butterfly valve 50 for controlling flow of a medium, for example flow of water, for example in a pipe or system of pipes. As can be seen, the housing 40 is adapted to fit between the flanges of two pipes (not shown). Valves of other designs and applications, for example a ball valve, can be substituted for the butterfly valve without departing from the subject disclosure. The actuator 20 is a pneumatic actuator. Actuators of other types, for example an electromechanical actuator, can be substituted for the pneumatic actuator 20 without departing from the subject disclosure.

Referring now to FIGS. 3, 4, 5A, and 5B, exploded, perspective, and sectional views of the torque limiting coupling assembly 100 are shown. The torque limiting coupling assembly 100 includes a number of components: an actuator coupling 110; a valve shaft coupling 120; a sleeve 130; a biasing element 140; and a connector 150. The components are aligned along a common axis of rotation Y-Y. The components of the torque limiting coupling assembly 100 are shown in a partial transparent view in FIG. 3, wherein portions of the components that would otherwise be hidden by opaque surfaces of the components are illustrated with dashed lines. The torque limiting coupling assembly 100 is shown in normal operation, i.e., in a first operating configuration, in FIGS. 4, 5A, and 5B.

Figure 3:
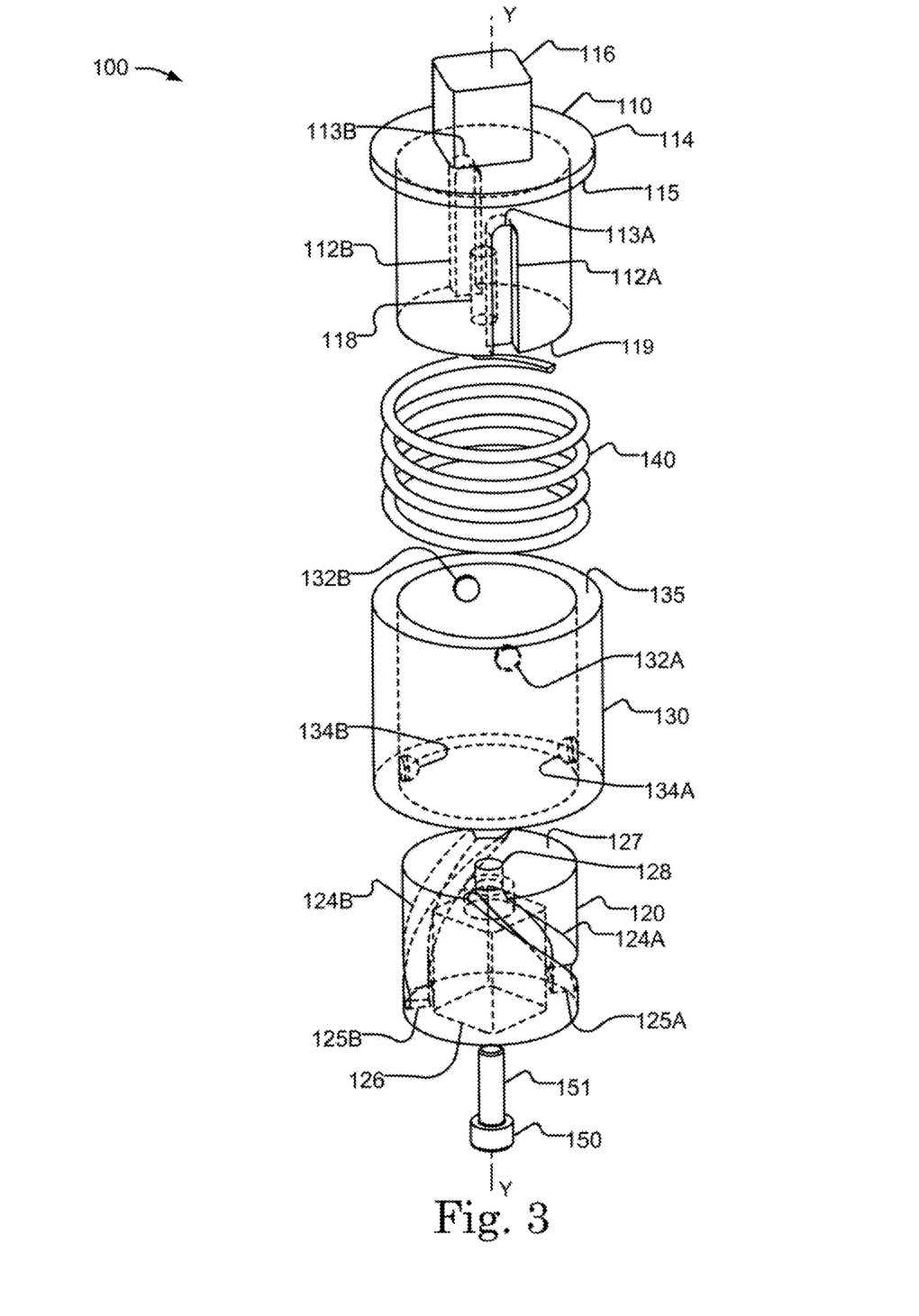
FIG. 3 is an exploded perspective view of the torque limiting coupling assembly of FIGS. 1 and 2.
Figure 4:
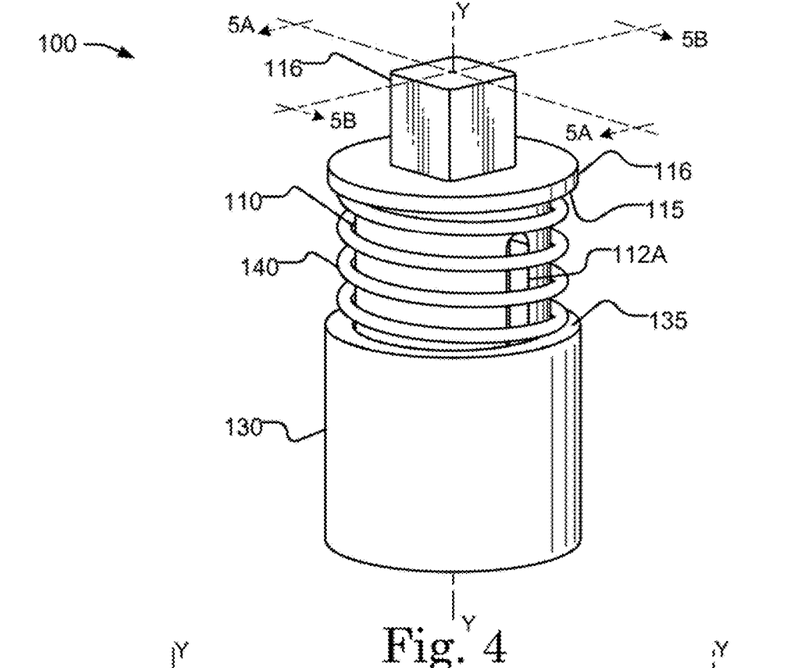
FIG. 4 is a perspective view of the torque limiting coupling assembly of FIG. 3 shown in normal operation.

The valve shaft coupling 120 includes the valve shaft interface 126 for connecting to a valve shaft; for example, and referring to FIG. 2, for connecting to the valve shaft 32. The valve shaft coupling 120 includes two helical grooves 124A, 124B, which both extend distally from a top surface 127 of the valve shaft coupling 120 and both of which twist around the axis Y-Y. Each helical groove 124A, 124B terminates at a distal closed end 125A, 125B, respectfully. In further embodiments (not shown), a valve shaft coupling 120 can include more than two helical grooves 124, for example three, four, five, or six helical grooves.

The actuator coupling 110 includes the actuator interface 116 for connecting to an actuator; for example, and referring to FIG. 2, for connecting to the valve shaft coupling 22 of the actuator 20. The actuator coupling 110 includes a collar 114 having a bottom surface 115. The actuator coupling 110 includes two linear axial grooves 112A, 112B, each of which extend proximally along the axis Y-Y from a bottom surface 119 of the actuator coupling 110. Each linear groove terminates at a proximal closed end 113A, 113B, respectfully. In further embodiments (not shown), an actuator coupling 110 can include more than two linear axial grooves 112, for example three, four, five, or six linear axial grooves 112. In some embodiments, an actuator coupling 110 includes a number of linear axial grooves 112 that is the same as the number of helical grooves 124 comprising a corresponding valve shaft coupling 120. However, an actuator coupling 110 having more or fewer linear axial grooves 112 as compared to the number of helical grooves 124 of a corresponding valve shaft coupling does not depart from the subject technology.

Figure 5A:
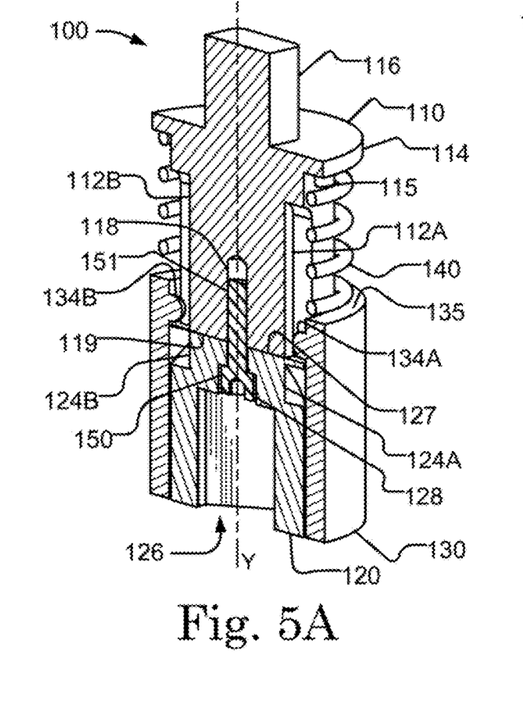
FIGS. 5A and 5B are cross-sectional perspective views of the torque limiting coupling assembly of FIG. 4.
Figure 5B:
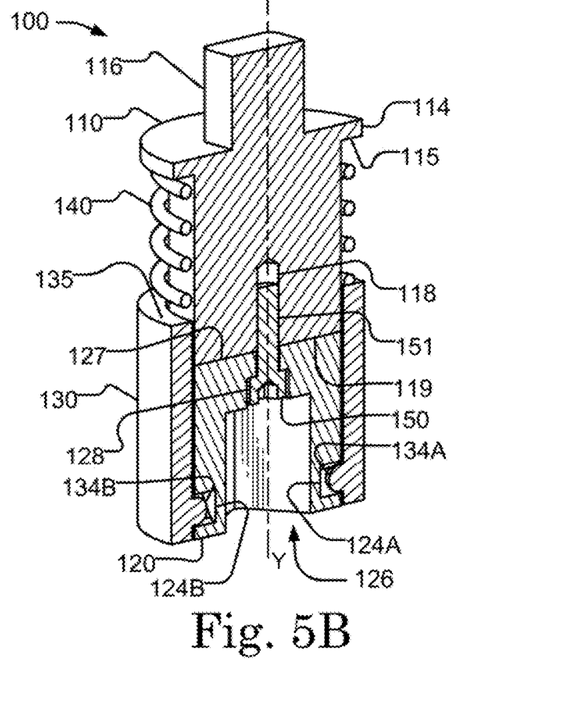

The actuator coupling 110 is coupled to the valve shaft coupling 120 along the axis Y-Y. The connector 150 aligns the actuator coupling 110 and valve shaft coupling 120 along the axis Y-Y while enabling free rotation of the couplings 110, 120 around the axis Y-Y and relative to each other. As best seen in FIGS. 5A and 5B, in an exemplary embodiment, the connector 150 includes a pin 151 having a press fit connection with the connector interface passage 118 of the actuator coupling 110 and a slip fit connection with a throughhole 128 of the valve shall coupling 120 such that the valve shaft coupling 120 can rotate freely around the connector 150 relative to the actuator coupling 110. In another embodiment, the connector 150 includes a threaded pin 151, for example a screw, wherein threads of the pin 151 interface with threads of the connector interface passage 118 of the actuator coupling 110. Still referring to FIGS. 3-5B, the throughhole 128 of the valve shaft coupling 120 has a smooth inner surface and an inner diameter that is greater that an outer diameter of the pin 151 of the connector 150 so that the valve shaft coupling 120 is enabled to rotate freely relative to the actuator coupling 110.

The sleeve 130 is slidably mounted to the valve shaft coupling 120 and to the actuator coupling 110. The sleeve 130 includes two radially inward facing proximal bosses 132A, 132B which are captured within respective linear axial grooves 112A, 112B of actuator coupling 110. The radially inward facing proximal bosses 132A, 132B slide within the linear axial grooves 112A, 112B, which enables the sleeve 130 to translate linearly along the axis Y-Y, for example relative to the actuator coupling 110 and to the valve shaft coupling 120. In further embodiments (not shown), a sleeve 130 can include more than two radially inward facing proximal bosses 132, for example three, four, five, or six radially inward facing proximal bosses. Typically a sleeve 130 includes a same number of radially inward facing proximal bosses 132 as the number of linear axial grooves 112 of a corresponding actuator coupling 110. The radially inward facing proximal bosses 132 are disposed such that they each interface with a corresponding linear axial groove 112 when the sleeve 130 and actuator coupling 110 are assembled together.

Proximal travel of the radially inward facing bosses 132A, 132B is limited by respective proximal closed ends 113A, 113B of linear axial grooves 112A, 112B. Distal travel of the radially inward facing bosses 132A, 132B is limited by an interface of the open distal ends of the linear axial grooves and the top surface 127 of the valve shaft coupling 120.

The sleeve 130 includes two radially inward facing distal bosses 134A, 134B which are captured within respective helical grooves 124A, 124B of the valve shaft coupling 120. The radially inward facing distal bosses 134A, 134B slide within the helical grooves 124A, 124B, which enables the sleeve 130 to translate linearly along the axis Y-Y, for example relative to the actuator coupling 110 and to the valve shaft coupling 120. In further embodiments (not shown), a sleeve 130 can include one or more than two radially inward facing distal bosses 134, for example three, four, five, or six radially inward facing distal bosses. A sleeve 130 typically includes a same number of radially inward facing distal bosses 134 as there are helical grooves 124 of a corresponding valve shaft coupling 120. The radially inward facing distal bosses 134 are disposed such that each radially inward facing distal boss 134 interfaces with a corresponding linear helical groove 124 when the sleeve 130 and valve shaft coupling 120 are assembled together.

Sliding of the radially inward facing distal bosses 134A, 134B within the helical grooves 124A, 124B also enables the sleeve 130 to rotate around the axis Y-Y relative to the valve shaft coupling 120. Capture of the radially inward facing proximal bosses 132A, 132B within the linear axial grooves 112A, 112B of the actuator coupling 110 prevents the sleeve 130 from rotating around the axis Y-Y independent of the actuator coupling 110. In this manner, the sleeve 130 is enabled to slide axially relative to both the actuator coupling 110 and the valve shaft coupling 120, to rotate around the axis Y-Y independently of rotation of the valve shaft coupling 120 or coupled to rotation of the valve shaft coupling 120, and to rotate around the Y-Y axis with rotation of the sleeve 130 coupled to rotation of the actuator coupling 110. Further, this arrangement enables the actuator coupling 110 to rotate around the axis Y-Y independently of rotation of the valve shaft coupling 120. Together, these relative rotations and linear motions, along with additional components and features, enable the torque limiting functionality of the torque limiting coupling assembly 100, as will be explained in more detail below.

Distal travel of the radially inward facing distal bosses 134A, 134B of the sleeve 130 is limited by respective distal closed ends 125A, 125B of the helical grooves 124A, 124B of the valve shaft coupling 120. Proximal travel of the radially inward facing bosses 134A, 134B is limited by an interface of the open distal ends of the helical grooves 124A, 124B and the bottom surface 119 of the actuator coupling 110.

The bias element 140 is disposed between the bottom surface 115 of the collar 114 of the actuator coupling 110 and a top surface 135 of the sleeve 130. As shown, an exemplary embodiment of the bias element 140 is a helical spring, for example a spring fashioned from a spring steel material. Alternative embodiments of the bias element 140 include, for example, one or more of a springs made from any suitable elastically deformable material, a flexure washer spring, a leaf spring, one or more compressible rubber rings and the like. More generally, the bias element 140 can include any suitable structure capable of exerting a biasing force between the collar 114 and the sleeve 130 and capable of elastically deforming in response to a force exerted by the sleeve 130 on the bias element 140.

The bias element 140 urges the sleeve 130 distally, i.e., away from the collar 114. In normal operation of the torque limiting coupling assembly 100, i.e., in the first operating configuration shown in FIGS. 4, 5A, and 5B, the bias element 140 urges the radially inward facing distal bosses 134A and 134B into contact with the closed distal ends 125A and 125B of respective helical grooves 124A, 124B of the valve shaft coupling 120, thereby coupling rotation of the valve shaft coupling 120 to rotation of the actuator coupling 110. As long as the torque between the valve shaft coupling 120 and the actuator coupling 110 is less than the force applied by the bias element 140, the valve shaft coupling 120 and the actuator coupling 110 rotate together when rotational force is applied to the actuator interface 116.

Figure 6A:
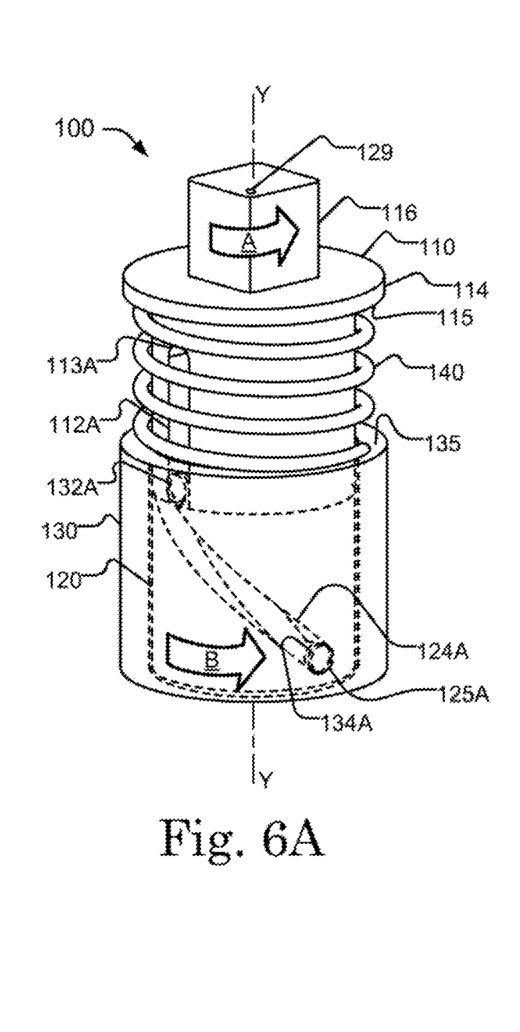
FIG. 6A is a perspective view of the torque limiting assembly of FIG. 3 shown in normal operation.
Figure 6B:
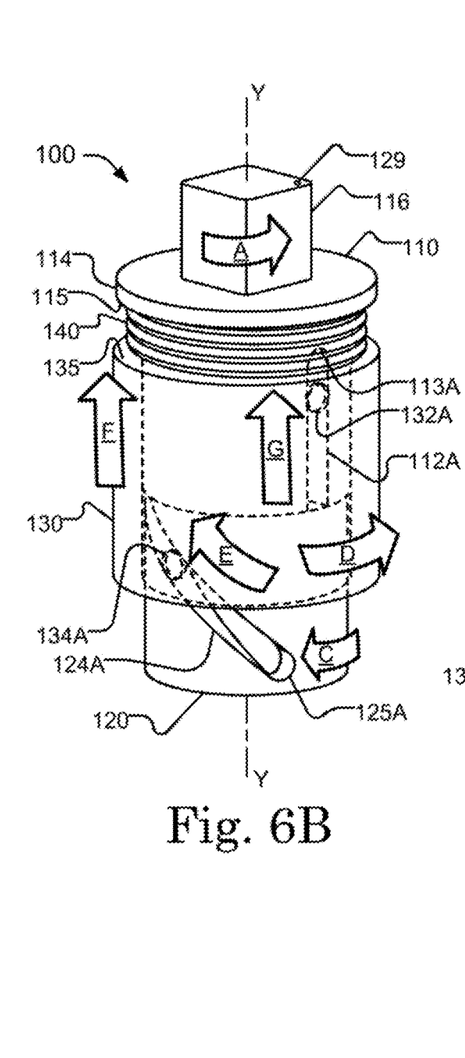
FIG. 6B is a perspective view of the torque limiting coupling assembly of FIG. 3 shown in torque actuated operation.
Figure 6C:
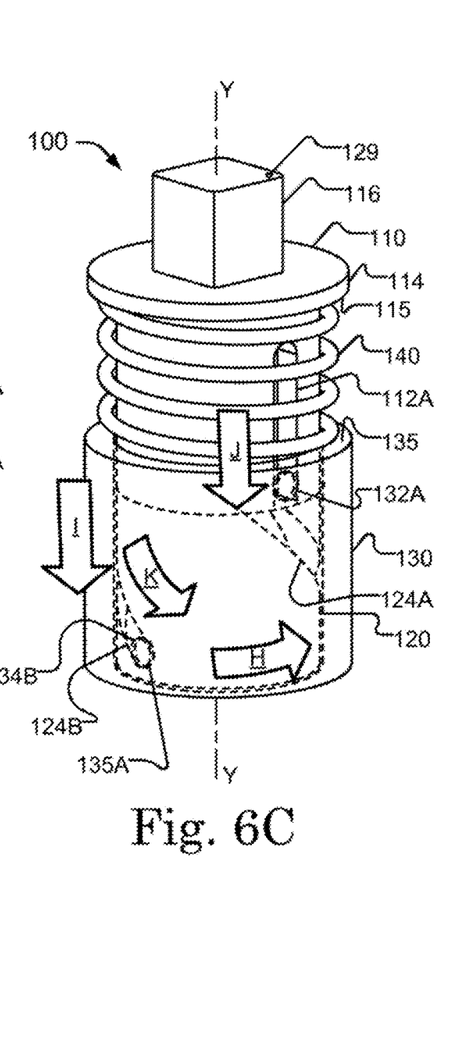
FIG. 6C is a perspective view of the torque limiting coupling assembly of FIG. 3 shown in normal operation, following return from torque actuated operation.

Referring now to FIGS. 6A, 6B, and 6C, the torque limiting coupling assembly 100 is shown in perspective view in three configurations: in normal operation, i.e., the first operating confirmation in FIG. 6A; in a second or torque actuated operation in FIG. 6B; and returned to normal operation following torque actuated operation, i.e., in a third operating configuration, in FIG. 6C. Portions of the sleeve 130, of the actuator coupling 110, and of the valve shaft coupling 120 are shown in partial transparent view, wherein portions that would be hidden beneath an opaque outer surface of the sleeve 130 are illustrated with dashed lines. It is noted that while, in the following discussion, unitary instances of radially inward extending protrusions and corresponding grooves, e.g., radially inward extending proximal boss 132A and linear axial groove 112A, are described, the descriptions herein apply as well to opposing radially inward extending protrusions and corresponding grooves, e.g., to radially inward extending proximal boss 132B and linear axial groove 112B. The descriptions herein are also applicable to embodiments that include more or less than two pairs of corresponding radially inward extending protrusions and corresponding grooves. e.g., to three of more radially inward extending proximal bosses 132 and corresponding linear axial grooves 112 or to three or more radially inward extending distal bosses 134 and corresponding helical grooves 124.

Referring to FIGS. 3, 5A, 5B, and 6A, the torque limiting coupling assembly 100 is arranged in the first operating configuration in normal operation. Driving torque applied to the actuator coupling 110 through the actuator interface 116 in a first direction, indicated by arrow A, is transferred to the sleeve 130 through an interface of the radially inward facing proximal bosses 132A, 132B of the sleeve 130 with the linear axial grooves 112A, 112B of the actuator coupling 110. The driving torque engenders rotation of both the sleeve 130 and the valve shaft coupling 120 around the axis Y-Y in the first direction, as indicated by arrow B.

The driving torque is further transferred to the valve shaft coupling 120 through an interface of the radially inward facing distal bosses 134A, 134B of the sleeve 130 with the distal closed ends 125A, 125B of the helical grooves 124A, 124B of the valve shaft coupling 120. As a result, the sleeve 130 and the valve shaft coupling 120 both rotate together with the actuator coupling 110 around the axis Y-Y as indicated by arrows A and B.

Referring again to FIGS. 1 and 2, the driving torque is further transferred to the valve shaft 32 through the connection of the valve shaft interface 126 to the valve shaft 32, thereby generating a shaft torque and enabling rotation of the valve element 30 relative to the valve housing 40.

During normal operation, and referring now to FIGS. 1, 2, 3, and 6A, the valve element 30 may encounter a normal amount of resistance to rotation, for example resistance due to normal fluid pressure or normal flow rate of the medium within a system that includes the valve assembly 10. This normal amount of resistance engenders a counter-torque on the valve shaft coupling 120 in a direction opposite to the first direction, i.e., a torque in a direction opposite the direction indicated by arrow B. The normal counter-torque tends to urge the radially inward facing distal bosses 134A, 134B of the sleeve 130 out of the distal closed ends 125A, 125B of the helical grooves 124A, 124B i.e., the normal counter-torque tends to urge the radially inward facing distal bosses 134A, 134B proximally and in a second direction opposed to the first direction. However, the bias element 140 is configured to apply a force to the sleeve 130 to urge the radially inward facing distal boss 134A into continued contact the distal closed end 125A of the helical groove 124A, in opposition to the effects of the normal counter-torque. The bias element 140 is configured to apply an amount of force to the sleeve 130 that corresponds to a torque trip value. The torque trip value corresponds to a magnitude of counter-torque below which the torque limiting coupling assemble maintains normal operation, and remains in the first operating configuration. The bias element 140 can be selected, varied and tuned to change the torque trip value as appropriate for the application.

Although not shown if FIG. 6A, it is understood that torque is also transferred to the sleeve 130 through an interface of the radially inward facing proximal boss 132B with the linear axial groove 112B and from the sleeve 130 to the valve shaft coupling 120 through an interface of the inward facing distal boss 132B and the distal closed end 125I of the helical grooves 124B as noted above.

Referring to FIGS. 3, 5A, 5B, and 6B, the torque limiting coupling assembly 100 is shown in torque actuated operation, wherein the components of the torque limiting coupling assembly 100 are arranged in a second operating configuration in which the torque trip value has been exceeded. In other words, torque actuated operation of the torque limiting coupling assembly 100 can occur when the counter-torque discussed in relation to FIG. 6A reaches a magnitude that exceeds a threshold torque trip value, i.e., when a large counter-torque is applied the to the valve shaft coupling 120 through the valve shaft interface 126. This can occur, and now referring to FIG. 1, when debris disposed in the opening 42 of the valve body 40 impinges on rotation of the valve element 30. Large counter-torque can also be produced by a fluid pressure or fluid flow through the housing 40 of the valve element 30 that exceeds a normal threshold.

The large counter-torque tends to resist rotation of the valve shaft coupling 120 around the axis Y-Y, as indicated by arrow C. Driving torque applied to the actuator coupling 110, indicated by arrow A, causes the actuator coupling 110 to rotate around the axis Y-Y, with the amount of rotation corresponding to a desired position of the valve element 30. For example, the desired position of the valve element 30 may be a closed position and the actuator coupling 110 is rotated, by the actuator 20, a quarter turn to a position that corresponds to the closed position as illustrated by a reference dot 129 on the interface 116. The sleeve 130 also rotates around the axis Y-Y, as indicated by arrow D. Rotation of the sleeve 130 is coupled to rotation of the actuator coupling 110 by the interface of radially inward facing proximal bosses 132A, 132B of the sleeve 130 with the linear axial grooves 112A, 112B of the actuator coupling 110. As will be appreciated, the rotational length of the grooves 124A, 124B may be approximately 90 degrees or some other value to match an expected rotational travel of the interface 116 when moved between extreme positions.

However, the large counter-torque tends to urge the radially inward facing distal bosses 134A, 134B of the sleeve 130 out of the distal closed ends 125A, 125B of the helical grooves 124A, 124B i.e., when a magnitude of the counter-torque surpasses the torque trip value. The large counter-torque urges the radially inward facing distal boss 134A proximally and in a second direction opposed to the first direction, as indicated by arrow E. The bias element 140 tends to resist the motion of the radially inward facing distal bosses 134A, 134B relative to the helical grooves 124A, 124B. However, the biasing potential of the bias element 140 is exceeded by counteracting forces engendered by the large counter-torque, i.e., when a magnitude of the large counter-torque exceeds a torque trip value. In this manner, the torque trip value corresponds to a magnitude of a resistance to compressive force, or biasing potential, provided by the bias element 140. As a result, the bias element 140 will compress.

The actuator coupling 110 rotates freely relative to the valve shaft coupling 120 around the axis Y-Y. In this manner, rotation of the actuator coupling 110 is decoupled from rotation of the shaft coupling 120 when the biasing potential of the bias element 140, and corresponding torque trip value, are exceeded (e.g., torque actuated operation). The sleeve 130 travels proximally relative to the actuator coupling 110, indicated by arrow F, and the radially inward facing proximal bosses 132A, 132B slide proximally within the linear axial grooves 112A, 112B as indicated by arrow G.

Proximal travel of the sleeve 130 compresses the bias element 140, thereby storing potential energy therein. In this manner, torque applied to the actuator coupling 110 is translated into potential energy stored in the bias element 140, thereby transferring the driving torque to the bias element 140 rather than to the valve shaft coupling 120, and therethrough to a valve shaft, e.g., shaft 32 (see FIG. 2B), when the torque trip value is exceeded. The sleeve 130 compresses the bias element while the actuator coupling 110 rotates with respect to the valve shaft coupling 120 rather than forcing the valve shaft coupling 120 to turn or to apply further torque to a valve shaft and valve element that may be operably coupled to the valve shaft coupling 120. Thus, torque applied to the actuator coupling 110 is not transferred through the torque limiting valve coupling 100 to counter the large counter-torque applied to the valve shaft coupling 120, thereby shielding components of a valve, for example a valve shaft, connected to the torque limiting valve coupling 100 from excessive torque which could otherwise damage the valve. It is noted that this arrangement also shields an actuator operably connected to the torque limiting valve coupling 100 from excessive torque. Travel of the sleeve 130 may be limited in the proximal direction by the proximal closed ends 113A, 113B stopping the bosses 132A, 132B. The bias element 140 may also be selected to limit travel of the sleeve 130 in the proximal direction.

Referring to FIGS. 3, 5A, 5B, and 6C, the torque limiting valve coupling 100 is shown returning to normal operation following torque actuated operation, with the components of the torque limiting valve coupling 100 shown in a third operating configuration. The torque limiting valve coupling 100 may return from torque actuated operation to normal operation when the large or abnormal counter-torque is removed, i.e., when a magnitude of the counter-torque no longer exceeds the torque trip value. The large counter-torque may be removed, for example and referring now to FIG. 1, when debris that blocks the rotation of the valve element 30 relative to the valve body 40 is cleared or when another condition that engendered the abnormal counter-torque is otherwise resolved. Referring once again to FIG. 6C, the actuator coupling 110 does not rotate further, having been moved to a position corresponding to a desired position of the valve element 40 during torque actuated operation, as shown in FIG. 6B.

During return to normal operation, the valve shaft coupling 120 rotates relative to the actuator coupling 110. The valve shaft coupling 120 rotates to a position corresponding to the desired position of the valve element 30 discussed previously, thereby bringing the actuator coupling 110 and the valve shaft coupling 120 into normal alignment. For example, the valve shaft coupling 120 may rotate to a position corresponding to a closed position of a valve element 30, thereby bring the valve shaft coupling 120 into normal alignment with the actuator coupling 110 which was rotated to the closed position during torque actuated operation of the torque limiting coupling assembly 110.

Upon removal of the abnormal counter-torque, the bias element 140 is enabled to expand and to urge the sleeve 130 proximally, as indicated by arrow I. The radially inward facing proximal bosses 132A, 132B of the sleeve 130 slide distally in the axial linear grooves 112A, 112B of the actuator coupling 110, as previously discussed, as indicated by arrow J. The radially inward facing distal bosses 132A, 132B slide distally in the first direction, as indicated by arrow K, and thereby engenders rotation of the valve shaft coupling 120 relative to the actuator coupling 110 in the first direction, as indicated by arrow H.

It is noted that although not shown, when a torque is applied to the actuator coupling 110 in a direction opposite to that of first direction, which is indicated for example in FIGS. 6A and 6B by arrow A, the torque limiting coupling assembly 100 operates in an analogous manner to shield a valve or an actuator from large counter-torque. For example, when a driving torque is applied to the torque limiting coupling assembly 100 in a second direction opposite the first direction, in normal operation the radially inward facing distal bosses 134A, 134B are urged into the distal closed ends 125A, 125B of respective helical grooves 124A, 124B by the bias element 140 and the valve coupling 120 is rotated in the second direction in tandem with the actuator coupling 110.

Advantageously, the torque limiting coupling assembly 100 is operable to shield the valve 50 from damaging torque while maintaining a physical connection between the actuator 20 and the valve stem 32. In this manner, the relative positions of the actuator 20 and the valve 50 are maintained during torque actuated operation, and positional accuracy is retained once normal operation resumes. This advantage over known torque limiting devices, for example over a known torque limiter used in an engine wherein an actuator may be disconnected, thereby limiting immediate future use once an over-torque event is resolved.

Figure 7:
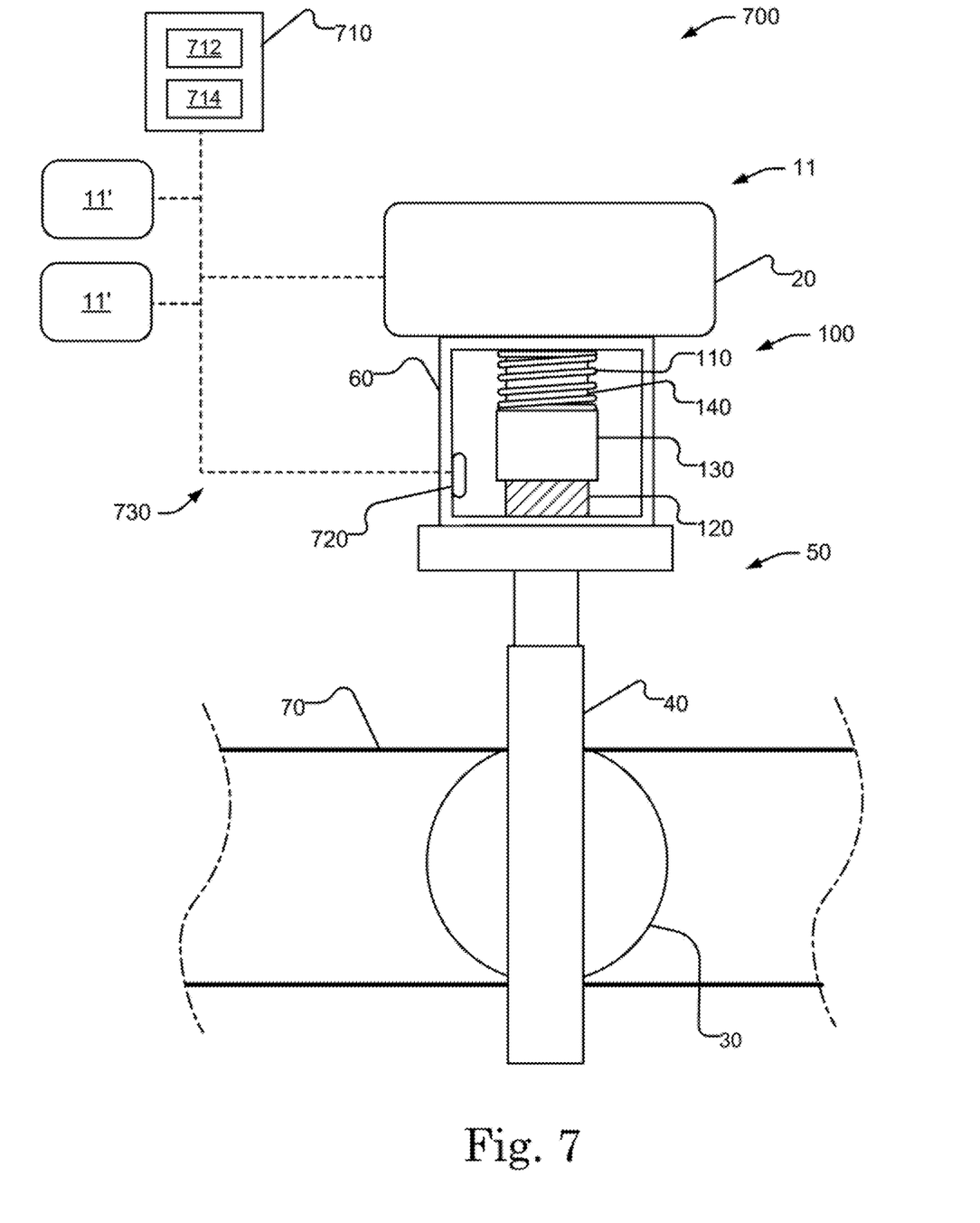
FIG. 7 is a schematic drawing showing a system that includes a valve assembly of FIGS. 1 and 2.

FIG. 7 shows a system 700 including a valve assembly 11 according to the subject technology. The valve assembly 11 is substantially similar to valve assembly 10 shown in FIGS. 1 and 2 and like components are labeled with like reference numbers. A bracket 60 is disposed between the actuator 20 and the valve housing 40. The valve 50 is disposed to regulate flow of a medium through a pipe 70, a portion of which is shown. The valve assembly 11 includes a torque limiting coupling assembly 100 disposed between the actuator 20 and the valve 50.

The system 700 includes a sensor 720, which may be mounted on the bracket 60 or otherwise disposed to sense at least one aspect of to the torque limiting coupling assembly 100. The system 700 includes a controller 710, which may include a processor 712 and associated memory 714. The controller 710 is communicatively coupled to the actuator 20 and to the sensor 720 over a communication network 730, for example over a known wired or wireless communication network. The controller 710 can communicate control signals to the actuator 20, for example to cause the actuator to move the valve element 30 from a first position to a second position.

The sensor 720 is configured and disposed to sense parameters of the torque limiting coupling assembly 100 and to communicate signals including an indication of the configuration to the controller 710. The sensor 720 may include a linear motion sensor configured to track linear motion of the sleeve 130, which corresponds to an operational state of the torque limiting coupling assembly 100, as previously discussed, e.g., in relation to FIGS. 6A through 6C. In some embodiments, the sensor 720 can include a visual sensor for monitoring a state of the torque limiting coupling assembly 100.

The controller 710 may receive signals from the sensor and determine, based on information contained in the signals, an operational state of the torque limiting coupling assembly 100. The controller 710 may, in response to the operational state, communicate one or more control signals to the actuator 20. The controller may, in response to the operational state, communicate an operational state of the valve assembly 11, for example an indication of normal or torque actuated operation of the valve 50 or of the torque limiting coupling assembly 100, to another computerized system, for example to a central control or monitoring system, or to a user. In this manner, the system 700 can track operation of the valve system 11, for example by tracking whether the valve element 30 is at a correct angle. e.g., at an angle instructed by the controller 710, based at least in part upon whether the torque limiting coupling assembly 100 is a normal configuration.

It is noted that the system 700 can include multiple instances of valve system 11, e.g., one or more instances of additional valve systems 11', each of which operates and is configured similarly to valve system 10. The controller 710 can communicate with and control and track the operation of the multiple valve systems 11, 11'.

Referring now to FIGS. 6A, 6B and 7, the torque limiting coupling assembly 100 is shown in torque actuated operation, wherein the components of the torque limiting coupling assembly 100 are arranged in the second operating configuration, as previously discussed. Referring now to FIG. 7, it is noted that the valve shaft coupling 120 may be colored differently from the sleeve 130, as indicated by a hatch patterning of the valve shaft coupling 120. For example, the valve shaft coupling 120 may include a bright or otherwise eye catching coloration, such as yellow, orange, or a red while the sleeve 130 may include a more neutral color, for example white or beige.

In normal operation, as shown in FIG. 6A, the valve shaft coupling 120 is covered by the sleeve 130 while in torque actuated operation, as shown in FIGS. 6B and 7, the valve shaft coupling 120 is uncovered, thereby exposing the bright or otherwise eye catching coloration of the valve shaft covering 120, which may be visible to an operator of the system 700. This advantageously provides an easily discernable visual indication of torque actuated operation of the valve assembly 11.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

Further, although the subject technology has been described with respect to the field of pneumatic actuated valves, and in particular to a butterfly-type valve it is envisioned that the subject technology would be equally applicable to other fields and applications such as on manually actuated valves, ball valves, and any other type of actuated valve wherein a driving torque generated by an actuator engenders a shaft torque in a valve shaft element.

While the subject technology has been described with respect to preferred embodiments, those skilled in the art will readily appreciate that various changes and/or modifications can be made to the subject technology without departing from the spirit or scope of the invention as defined by the appended claims. For example, each claim may depend from any or all claims in a multiple dependent manner even though such has not been originally claimed.

What is claimed is:

1. A torque limiting coupling assembly for a valve assembly having a valve element and an actuator for moving the valve element, the torque limiting coupling assembly comprising:
   a valve shaft coupling for connecting to the valve element, the valve shaft coupling forming opposing helical grooves, each helical groove having a distal closed end;
   an actuator coupling for connecting to the actuator and secured to the valve shaft coupling along an axis for free rotation about the axis, the actuator coupling: having a collar; and forming opposing linear axial grooves;
   a sleeve slidably mounted on the valve shaft coupling and the actuator coupling, the sleeve forming two or more radially inward facing distal bosses captured to slide in the respective helical groove and two or more radially inward facing proximal bosses captured to slide in the respective linear axial groove; and
   a bias element extending between the collar and sleeve to bias the sleeve distally so that the two radially inward facing distal bosses are normally in the distal closed end of the respective helical groove,
   wherein:
   in normal operation when the actuator rotates the actuator coupling in a first direction, the sleeve rotates with the actuator coupling by virtue of the radially inward facing proximal bosses in the linear axis grooves and the valve shaft coupling rotates with the sleeve by virtue of the radially inward facing distal bosses pressed into the distal closed end of the linear axis grooves by the spring and, thereby, the valve element turns with the valve shaft coupling; and
   in torque actuated operation during movement or attempted movement in the first direction when the valve element requires large force, torque is limited by the actuator coupling turning freely with respect to the valve shaft coupling so that the radially inward facing distal bosses are driven proximally in the helical grooves by the valve shaft coupling to compress the bias element while the actuator coupling rotates with respect to the valve shaft coupling rather than forcing the valve shaft coupling to turn.

2. The torque limiting coupling assembly of claim 1, further wherein the bias element is selected from the group consisting of: a helical spring; a flexure washer spring; and leaf springs.

3. The torque limiting coupling assembly of claim 1, further wherein upon return from torque actuated operation to normal operation, the valve shaft coupling rotates with respect to the actuator coupling so that the valve shaft actuator coupling and the actuator coupling return to correct normal alignment.

4. The torque limiting coupling assembly of claim 1, further wherein when the actuator moves the valve element in a second direction opposite the first direction, the radially inward facing distal bosses slide into the distal closed end of the respective helical groove.

5. The torque limiting coupling assembly of claim 1, further wherein the linear axial grooves have a closed proximal end that forms a travel stop of the sleeve.

6. The torque limiting coupling assembly of claim 1, further wherein a bottom surface of the actuator coupling encloses the helical grooves to form a travel stop of the sleeve.

7. A torque limiting coupling assembly for a valve assembly comprising:
   an actuator coupling configured to be coupled to a rotational actuator and to receive a driving torque from the rotational actuator;
   a valve shaft coupling configured to be coupled to a valve shaft and to apply a shaft torque to the valve shaft; and
   a sleeve configured to connect the actuator coupling and the value shaft coupling;
   a bias element;
   wherein the torque limiting coupling assembly is configured to:
   in a first operating configuration, transfer the driving torque received from the rotational actuator to the valve coupling, thereby generating the shaft torque;
   in a second operating configuration, transfer the driving torque received from the rotational actuator to the bias element; and
   in a third operating configuration translate a linear force applied to the sleeve by the bias element into a rotational torque and to transfer the rotational torque to the valve coupling, thereby generating the shaft torque.

8. The torque limiting coupling assembly of claim 7, wherein the valve includes a valve element and the valve shaft is coupled to the valve element, further wherein:
   in the first operating configuration, the driving torque provided by the rotational actuator moves the valve element to a selected position;
   in the second operating configuration, the driving torque provided by the rotational actuator moves only the actuator coupling to a rotational orientation that corresponds to the selected position of the valve element; and
   in the third operating configuration, the torque limiter coupling moves the valve element to the selected position.

9. The torque limiting coupling assembly of claim 7, wherein the torque limiting coupling assembly is configured to transition from the first operating configuration to the second operating configuration when resistance to motion of the valve coupling imparts a resistance torque on the valve coupling having a magnitude that surpasses a torque trip value.

10. The torque limiting coupling assembly of claim 9, wherein:
   the actuator coupling, the valve shaft coupling, and the sleeve are each disposed coaxially along a common central axis;
   the actuator coupling comprises a collar extending radially outward relative to the central axis; and
   the bias element is disposed between a bottom surface of the collar and a top surface of the sleeve and is configured to urge the sleeve away from the actuator coupling and toward the valve coupling.

11. The torque limiting coupling assembly of claim 10, wherein torque trip value corresponds to a magnitude of a resistance to compressive force provided by the bias element.

12. The torque limiting coupling assembly of claim 9, wherein the sleeve and the valve actuator are each disposed along a common axis and comprise a mechanical interface therebetween, wherein:
- the mechanical interface comprises:
  - one or more helical grooves disposed on an outer surface of the valve actuator and extending longitudinally alone the common axis; and
  - one or more radially inward facing distal bosses extending from an inner surface of the sleeve;
- each of the one or more radially inward facing distal bosses is configured to interface with a one of the helical grooves; and
- the mechanical interface is configured to urge linear motion of the sleeve relative to the valve actuator along the common axis when resistance to motion of the valve coupling imparts the resistance torque on the valve coupling having a magnitude that surpasses the torque trip value.

13. A torque limiting coupling assembly for a valve assembly having a valve element and an actuator for moving the valve element, the torque limiting coupling assembly comprising:
- a valve shaft coupling for connecting to the valve element, the valve shaft coupling forming at least one helical groove;
- an actuator coupling for connecting to the actuator and secured to the valve shaft coupling for free rotation, the actuator coupling forming at least one linear axial groove;
- a sleeve slidably mounted on the valve shaft coupling and the actuator coupling, the sleeve forming at least one distal boss captured to slide in the respective helical groove and at least one proximal boss captured to slide in the respective linear axial groove; and
- a bias element extending between the actuator coupling and sleeve to bias the sleeve distally,
- wherein in torque actuated operation during movement in a first direction when the valve element requires large force, torque is limited by the actuator coupling turning freely with respect to the valve shaft coupling so that the radially inward facing distal boss is driven proximally in the helical groove by the valve shaft coupling to compress the bias element while the actuator coupling rotates with respect to the valve shaft coupling.

14. The torque limiting coupling assembly of claim 13, wherein valve shaft coupling is colored to conspicuously indicate torque actuated operation.

15. The torque limiting coupling assembly of claim 13, further comprising a sensor for monitoring a state of the sleeve and a microcontroller for processing a signal from the sensor.

\* \* \* \* \*